(12) United States Patent
Hoffmann et al.

(10) Patent No.: US 9,019,367 B2
(45) Date of Patent: Apr. 28, 2015

(54) METHOD FOR DYNAMICALLY DETECTING THE FILL LEVEL OF A CONTAINER, CONTAINER THEREFOR, AND SYSTEM FOR DYNAMICALLY MONITORING THE FILL LEVEL OF A PLURALITY OF CONTAINERS

(75) Inventors: Franz-Josef Hoffmann, Dayton, OH (US); Albrecht Faber, Eggenfelden (DE)

(73) Assignee: Wuerth Elektronik ICS GmbH & Co. KG, Niedernhall (DE)

(*) Notice: Subject to any disclaimer, the term of this patent is extended or adjusted under 35 U.S.C. 154(b) by 857 days.

(21) Appl. No.: 13/157,607

(22) Filed: Jun. 10, 2011

(65) Prior Publication Data
US 2012/0314059 A1  Dec. 13, 2012

(51) Int. Cl.
H04N 7/18 (2006.01)
G01F 23/292 (2006.01)
G06T 7/00 (2006.01)
B65D 90/48 (2006.01)

(52) U.S. Cl.
CPC ............ G01F 23/292 (2013.01); G06T 7/0004 (2013.01); G06T 2207/10024 (2013.01); G06T 2207/30208 (2013.01); G06T 2207/30242 (2013.01); B65D 90/48 (2013.01)

(58) Field of Classification Search
USPC ........................................................ 348/135
See application file for complete search history.

(56) References Cited

U.S. PATENT DOCUMENTS

| | | | | |
|---|---|---|---|---|
| 3,553,455 | A * | 1/1971 | Sato et al. ................... | 250/201.7 |
| 3,703,955 | A * | 11/1972 | Inacker .......................... | 206/532 |
| 3,902,182 | A * | 8/1975 | Hillborg .......................... | 396/3 |
| 4,503,424 | A * | 3/1985 | Evenwoll ....................... | 340/617 |
| 5,163,127 | A * | 11/1992 | Ikumi et al. .................... | 345/426 |
| 5,581,625 | A * | 12/1996 | Connell ......................... | 382/100 |
| 5,854,679 | A * | 12/1998 | Bourgoin et al. .............. | 356/620 |
| 6,072,903 | A * | 6/2000 | Maki et al. ..................... | 382/190 |
| 6,098,029 | A * | 8/2000 | Takagi et al. .................. | 702/127 |
| 6,137,855 | A * | 10/2000 | Hill et al. .......................... | 377/8 |
| 6,434,257 | B1 * | 8/2002 | Mohan et al. .................. | 382/110 |
| 6,516,661 | B1 * | 2/2003 | Spillman et al. ................ | 73/149 |
| 8,331,729 | B2 * | 12/2012 | Park et al. ...................... | 382/286 |
| 2002/0017131 | A1 * | 2/2002 | Neuhaus et al. ............ | 73/304 C |
| 2005/0136509 | A1 * | 6/2005 | Gholap et al. ............... | 435/40.5 |
| 2006/0045323 | A1 * | 3/2006 | Ateya ............................. | 382/141 |
| 2006/0120590 | A1 * | 6/2006 | Han et al. ...................... | 382/154 |
| 2007/0242870 | A1 * | 10/2007 | Anderson et al. ............. | 382/141 |
| 2009/0290811 | A1 * | 11/2009 | Imai ............................. | 382/285 |
| 2009/0314016 | A1 * | 12/2009 | Ashrafzadeh et al. .......... | 62/137 |
| 2009/0317002 | A1 * | 12/2009 | Dein ............................. | 382/224 |

(Continued)

Primary Examiner — Sath V Perungavoor
Assistant Examiner — Peter D Le
(74) Attorney, Agent, or Firm — Pierce Atwood LLP; Kevin M. Farrell; Reza Sadr

(57) ABSTRACT

The application pertains to detecting the fill level of a container for transporting and/or storing objects. This is achieved by determining an estimate of the number of objects in the container with the aid of a value of the container volume occupied by the objects or the already emptied container volume, on the basis of an average object volume of one or of a predetermined number of the objects, as long as the container bottom is covered by objects situated in the container. When a predetermined portion of the container bottom is visible, the objects in the container are counted, by identifying the individual objects on the container bottom. In addition, a container that is particularly suitable for the proposed methods and a system with a plurality of such containers are proposed.

16 Claims, 6 Drawing Sheets

(56) References Cited

U.S. PATENT DOCUMENTS

2010/0025509 A1* 2/2010 Matlin et al. .................. 241/100
2010/0158386 A1* 6/2010 Smilansky .................... 382/194
2010/0323609 A1* 12/2010 Aramaki ...................... 455/3.01
2011/0188708 A1* 8/2011 Ahn et al. ..................... 382/106
2012/0200697 A1* 8/2012 Wuestefeld et al. .......... 348/137
2013/0269832 A1* 10/2013 Gengerke ....................... 141/95

* cited by examiner

METHOD FOR DYNAMICALLY DETECTING THE FILL LEVEL OF A CONTAINER, CONTAINER THEREFOR, AND SYSTEM FOR DYNAMICALLY MONITORING THE FILL LEVEL OF A PLURALITY OF CONTAINERS

FIELD OF THE INVENTION

The present invention pertains to methods for, in particular, optically detecting the fill level in a container for transporting and/or storing objects, particularly piece goods or bulk materials, with a container bottom and an inner container wall, to a container that is particularly suitable for carrying out the method and to a system with several such containers for dynamically monitoring the fill levels in the containers.

BACKGROUND OF THE INVENTION

It is basically known to utilize containers for storing and/or for transporting objects, e.g., hardware such as screws, nuts or electronic components, i.e., generally piece goods or also bulk materials.

Containers of this type may be used as transport containers and/or storage containers, for example, in a storage facility with high-bay racks. In this case, the containers may also be used in a combined fashion, e.g., by storing containers in a high-bay rack facility in the form of storage containers and transporting said containers to another location such as, if applicable, a mobile work station in the form of transport containers such that they serve as a decentralized storage site for certain piece goods or bulk materials for a certain period of time.

Conventional transport and/or storage containers that form part of a warehousing or inventory management system usually involve a high effort if it is important to ensure that a sufficient supply of piece goods or the bulk material is always available. For this purpose, it is necessary to log the filling and the withdrawal processes for the individual containers. In order to correct errors that can inevitably occur over time, it is required to regularly take stock of all stored articles in the form of a manual count. The effort involved with such stock-taking processes, as well as the effort for detecting the input and the withdrawal of goods into/from the containers in the form of a logistics system, is personnel-intensive and cost-intensive, but still error-prone.

For example, EP 0 952 432 A1 discloses a system for detecting a material quantity in a container. For this purpose, infrared light sources and infrared light sensors are arranged behind container side walls that lie opposite of one another and are transparent to infrared light such that infrared light emitted into the container by the infrared light sources is absorbed or reflected by the material contained therein and can be received with oppositely arranged infrared light sensors in such a way that the fill level of the container can be determined. With respect to a certain material quantity, however, this method is only sufficiently accurate at high fill levels because the relative measuring error increases as the fill level decreases. This is particularly problematic with articles in the form of the initially mentioned piece goods or bulk materials because the detection of a certain residual quantity usually serves as a trigger (notification limit) for reordering the article in a timely fashion. It is therefore important to detect the current residual quantity as accurately as possible when the number of articles situated in the container approaches the notification limit.

One potential objective can be seen in proposing a correspondingly improved method for detecting the fill level in a container for transporting and/or storing objects, particularly piece goods or bulk materials, with a container bottom and an inner container wall, making available a container suitable for carrying out the method and proposing a system for dynamically monitoring the fill level of a plurality of such containers.

SUMMARY OF THE INVENTION

According to a first aspect, this objective is attained with the proposed method for detecting the fill level of a container for transporting and/or storing objects, particularly piece goods and/or bulk materials.

According to a second aspect of the invention, this objective is furthermore attained with the proposed container for transporting and/or storing objects, particularly piece goods and/or bulk materials, which is particularly well suited for a method according to the first aspect.

According to a third aspect of the invention, this objective is furthermore attained with the proposed system for dynamically detecting and monitoring the fill level of containers for transporting and/or storing objects, particularly piece goods and/or bulk materials.

A central idea consists of configuring a method for efficiently detecting the fill level of a container such that the method delivers a result, the accuracy of which with respect to determining the number of objects situated in the container increases as the number of objects decreases. This is a significant distinction from known methods, in which the relative error with respect to the determined number of objects in a container increases as the number of objects decreases. A precise determination of the remaining stock of objects stored in a container allows, for example, the timely reordering in a warehousing or inventory management system with a plurality of such containers, the fill level of which needs to be dynamically monitored for this purpose. In this context, efficiently detecting means, in particular, that the respective effort involved in determining the current fill level of a container is as optimal as possible with respect to the required accuracy.

It is therefore proposed that, as long as the container bottom is covered by objects situated in the container, the number of objects in the container is estimated based on the container volume occupied by the object and/or the already emptied container volume. A container bottom that is still completely covered with objects can be used as sufficient evidence for a sufficient quantity of objects still being situated in the container such that an estimation of the number of objects is sufficiently accurate. The estimation can be carried out based on an average object volume of one object or a certain number of objects.

It is furthermore proposed that, as soon as a certain portion of the container bottom is visible, the number of objects in the container is determined by identifying individual objects lying on the container bottom and individually counting these identified objects. Visible areas of the container bottom can be used as evidence for only a small residual quantity of objects still being situated in the container. Consequently, the result has the desired high accuracy, particularly in a container, in which only a few objects remain. For this purpose, the individual objects lying on the container bottom may be distinguished from the background formed by the container bottom, for example, by means of an image processing method for object recognition and subsequently counted.

One possible embodiment of the method is described below.

State vectors $Z(R, 1, t)$ can be defined for all locations or points within the volume of the described container, i.e., in the interior of the container. In this case, R as location sector describes the geometric position of the locations or points in the interior of the container, for example, with three orthogonal space coordinates x, y and z. The intensity status at the location R is described with l and t describes the time.

The points $R_{IO}$ situated on the inner surface of the container, i.e., on the inner container wall and on the bottom of the container, therefore can be described with appropriate state vectors $Z_{IO}(R_{IO}, 1, t)$ that basically have an intensity value l greater than 0 when the respective point $R_{IO}$ emits detectable radiation, i.e., if this point reflects light. Alternatively, a point $R_{IO}$ may also emit self-detectable radiation, for example, due to UV-active and/or IR-active properties of the inner container wall.

In addition, a point $R_{IO}$ on the inner surface of the container may also reflect or emit radiation when the point receives radiation, e.g., in the form of ambient light or light that is actively generated, for example, by means of LEDs. Radiation that is reflected or emitted by a point on the inner surface of the container in this fashion can then be detected by means of a detection device at a detection point if the emitted or reflected radiation is not absorbed on the optical path to the detection device.

For the method according to the first aspect, the intensities l may basically be detected with a digital resolution, i.e., with the values "l=1" (active) and "l=0" (inactive) depending on whether or not a radiation emission or radiation reflection takes place at the location R. In this context, a certain intensity threshold may also be predefined, wherein the detected intensity of a location or point in the container is not interpreted as "active" until the measured intensity exceeds the value of the intensity threshold. Alternatively, the intensities may also be detected with a predefined resolution, i.e., with a predefined quantization such as, for example, a certain number of n bits, wherein l can assume 2n values of the value range from 0 to 1 in this case.

The method according to the first aspect may comprise the following steps:
  a first step that (in order to initialize the method) consists of generating a 2-dimensional projection of 3-dimensional, spatially resolved reference intensity information $F(Z_{IO}, t_0)$ on the interior of the empty container, i.e., in an empty state, by means of a transformation F;
  a second step that consists of detecting a 2-dimensional projection of 3-dimensional, spatially resolved actual state intensity information $F(Z_x, T_x)$ on the interior of the container that is filled up to a current fill level, i.e., the filled container with an unknown fill level, at an arbitrary time $T_x$ by means of the transformation F; and
  a third step that, as long as the container bottom is covered by the objects situated in the container or not visible, consists of determining at least one fill level information on the container based on processing at least part of the detected actual state intensity information $F(Z_x, T_x)$ by interrelating this information to adjacent reference intensity information $F(Z_{IO}, t_0)$.

The implementation of the central idea therefore consists of acquiring fill level information for the container based on the actual state intensity information $F(Z_x, T_x)$. For this purpose, the actual state intensity information $F(Z_x, T_x)$ is interrelated to respectively adjacent reference intensity information $F(Z_{IO}, t_0)$. This interrelating can be realized with an operation, in which actual state intensity information $F(Z_x, T_x)$ on at least part of the points is respectively interrelated to the reference intensity information $F(Z_{IO}, t_0)$ of the points in at least one adjacent area.

In one particularly simple variation, the reference intensity information $F(Z_{IO}, t_0)$ can be acquired in the form of a digital reference image of the interior of the container and the actual state intensity information $F(Z_x, T_x)$ can be accordingly acquired in the form of a digital actual state image of the interior of the container that is filled up to a current fill level, namely by means of a detection device such as, for example, a camera, particularly a digital camera. The reference image and/or the actual state image can be stored for further processing.

This means that a system-immanent function of representation (transformal function) F of the detection device is applied in this approach in accordance with the arrangement of the detection device, for example, the installation site in or on the container such as, e.g., in the side wall of the container. The system-immanent function of representation F describes, for example, the imaging properties of a camera with an optical system and a 2-dimensional optical sensor such as, e.g., a CCD-sensor or CMOS-sensor for the state vectors $Z_{IO}(R_{IO}, 1, t)$ of the container at any time T and can be assumed to be sufficiently time-invariant for the proposed method.

Due to the imaging properties of the detection device, this system-immanent function of representation F generates a more or less distorted 2-dimensional projection of the 3-dimensional, spatially resolved intensity information on the interior of the container. In other words, the detection device integrated into the container generates an abstract 2-dimensional representation of the 3-dimensional reality. In this case, one space coordinate is eliminated, i.e., the 3-dimensional, spatially resolved intensity information is compressed to a 2-dimensional projection. However, the thusly generated 2-dimensional projection $F(Z_{IO})$ has the same information content as the 3-dimensional reality in this case.

In one particular additional development, the 2-dimensional reference intensity information $F(Z_{IO}, t)$ is newly acquired prior to each filling of the empty container. Even though it can be assumed that the properties of the inner container surfaces, i.e., of the container bottom and the inner container wall, and of the detection device are time-invariant, i.e., remain approximately constant, such that no loss of information is expected, this measure makes it possible to take into account damages or changes to the surface properties of the container bottom and the inner container wall and therefore to improve and ensure the accuracy for all fill level measurements carried out until the next refilling of the container.

All areas of the container bottom and the inner container wall that are covered by bulk material in the container, i.e., objects situated in the interior of the container, can be distinguished from non-covered areas of the bottom and the inner container wall due to shading, wherein the covered areas appear, for example, darker with respect to the detectable intensity.

Starting at a certain intensity value, it is highly probable that intensity values registered, for example, in the actual state image physically originate from non-covered surfaces of the container or surfaces of the container that are visible from the position of the detection device. In other words: the detectable intensities essentially pertain exclusively to still visible areas of the container bottom and/or the inner container wall, as well as the surfaces of the objects in the container that have a relatively complex shape.

As already mentioned above, an intensity threshold and/or sensitivity and/or selectivity can be predefined for the detection such that only intensities originating from the inner container wall and/or the container bottom are detected during the system-immanent transformation $F(Z_x, T_x)$. This makes it possible to eliminate state vectors of the objects and the possibly complex surface of the objects can be smoothed.

In one specific embodiment, the current fill level is detected by means of a calculation of inverse state vectors $F(Z_{IO-x}, T_x)$ for visible areas of the inner container wall within the same state space by applying a convolution operation or correlation operation of all or only one respective subset of the detected state vectors of the empty container $F(Z_{IO})$ to the detected state vectors of the container $F(Z_x, T_x)$ filled to an unknown fill level. The calculation can be mathematically formulated as follows:

$$[F(Z_{IO})*F(Z_x,T_x)](Z)=F(Z_{IO-x},T_x) \text{ for all } Z \text{ in the container.}$$

In an additional development of the method, a reference model for the empty container is furthermore generated. For this purpose, a predefined reference pattern subgroup is separated from the reference intensity information, i.e., the 2-dimensional projection $F(Z_{IO}, t_0)$ in the form of the 2-dimensional equivalent of the empty container. Subsequently, the reference pattern subgroup is transformed by means of a transformation G that is predefined such that a 3-dimensional reference model of the empty container is obtained. The 3-dimensional reference model can be calibrated, particularly with respect to the length, the width and the height of the container, with the aid of the actual dimensions of the container.

At this point, it should be noted that information on the system-immanent function of representation F(Z) of the detection device used in, on or outside the container is not important, but that merely the predefined transformation G(F) needs to be implemented, for example, by means of software in a processing device or, if applicable, already in the detection device or a separate processing device.

The predefined transformation G is realized such that it transforms the vectors of the reference pattern subgroup into state vectors of a 3-dimensional reference model of the empty container. The state vectors of the reference model no longer need to represent any intensity information, but rather merely an abstract three-dimensional structure.

In particular embodiments, the reference pattern subgroup in the form of an inner edge reference pattern contains all points $R_{IOKante}$ located on inner edges of the container and the respectively corresponding state vector $Z_{IOKante}(R_{IOKante}, 1, t)$. The reference pattern subgroup in the form of a marking reference pattern may alternatively or additionally contain all points on specially marked surface areas of the container bottom and/or the inner container wall and the respectively corresponding state vector $Z_{IOMuster}(R_{IOMuster}, 1, t)$.

In case the inner container edges are used as reference pattern subgroup, the transformation G results in an abstract three-dimensional "grid structure" of the container.

This makes it possible to additionally simplify the aforementioned interrelating operation such as, for example, a convolution operation or correlation operation because the state vector quantity Z(R, l, t) to be processed for the empty container, as well as for the partially filled container, can be reduced to a small part of the locations or points, namely those of the predefined reference pattern subgroup. This significantly reduces the computational effort such that, for example, the fill level can be detected more often per time unit and less computing power is required in remote systems.

If a single vertical scale is provided as marking on the inner container wall, the calculation can be reduced to a 1-dimensional problem in one particular embodiment, namely the length of the entire scale when the container is empty minus the length of the still visible part of the scale when the container is partially filled.

The determined inverse state vectors $F(Z_{IO-x}, T_x)$ can also be transformed into the 3-dimensional space of the reference model by means of the predefined transformation G, wherein the result of the transformation $G(F(Z_{IO-x}))$ represents the currently empty net volume of the partially filled container true-to-scale in the 3-dimensional space of the reference model.

In particular additional developments, concrete fill level information on the container, particularly a dynamic fill level measurement, can be realized based on the calibrated, abstract 3-dimensional reference model of the container.

A quantitative dimension in the form of the difference between the volume of the reference model of the empty container $G(F(Z_{IOKante}, t_0))$ and the empty net volume $G(F(Z_{IO-x}, T_x))$ can be determined as (first) fill level information on the container.

The number of objects in the container can be estimated as additional (second) fill level information on the container by dividing the first fill level information, i.e., the quantitative dimension for the fill level of the container, by a predefined volume, particularly an average volume required by an individual object or a certain number of objects. This makes it possible to estimate the number of objects, i.e., the number of a plurality of objects situated in the container. The absolute error is negligibly small as long as a sufficient number of objects are still situated in the container—which can be detected based on that the container bottom is still completely covered.

After determining the fill level of the container, the acquired information on the fill level can be stored together with a corresponding time stamp $T_x$ for the acquisition time and, if applicable, the inverse state vectors $F(Z_x, T_x)$.

This allows the following evaluations. It is possible, for example, to compare image data and/or to derive a dynamic consumption profile. For this purpose, the states of occupancy determined at different times $T_x$ merely need to be observed as a function of the respective time stamp. In addition, the storage of the respective inverse state vectors $F(Z_x, T_x)$, for example, in the form of digital images furthermore allows a subsequent remote inquiry of the actual status of the container as a function of the time.

In one particular additional development, the interior of the container is illuminated by means of a light source or several light sources prior to each generation of a 2-dimensional projection of 3-dimensional, spatially resolved intensity information. This may be realized, for example, with light of a certain wavelength or a certain wavelength range such as, for example, UV-light or IR-radiation. One or more UV-LEDs or IR-LEDs may be arranged adjacent to the detection device for this purpose. The illumination may only take place briefly, particularly in the form of a light or radiation flash, in order to maintain the energy consumption of the detection device, for example, a battery-operated detection device, as low as possible.

The active illumination basically improves the quality of the acquired intensity information. If the wavelength used or the wavelength range used is chosen accordingly, the contrast between the inner container wall and the objects situated in the container can also be improved.

The method described so far is very well suited for a container with completely covered container bottom because a sufficient quantity of objects is, as already mentioned above, still situated in the container, particularly if the container is filled with bulk material in the form of hardware such as screws, nuts, pins or the like. However, a relevant dimensional error may still occur if the container bottom already is partially visible, i.e., if only a few objects remain in the container.

Since precise information on the number of objects remaining in the container becomes more important when the container is almost empty, for example, so as to place a reorder at an ideal time, it is proposed to determine the number of objects in the container differently as soon as part of the container bottom becomes visible, i.e., when the container bottom is no longer completely covered by objects in the container. After all, a reliable detection of a completely empty container is also important, for example, in order to once again initialize the reference intensity information.

If it is determined that a certain number of state vectors $Z_{IOBoden}$ ($R_{IOBoden}$, 1, $T_x$) that can be assigned to the container bottom have a predefined intensity value after the detection of a 2-dimensional projection of 3-dimensional, spatially resolved actual state intensity information $F(Z_x, T_x)$ on the container with unknown fill level, the number of objects in the container is accordingly determined by evaluating state vectors $Z_{IOBoden}$($R_{IOBoden}$, 1, $T_x$) of the container bottom only, for example, by means of an image processing algorithm for object recognition. In other words, the container bottom as background information serves for individually identifying and counting the objects lying on the container bottom, i.e., the number of detected object is determined.

This means that the determination of fill level information based on the container volume, particularly an estimation of the number of objects based thereon, can be completely eliminated as soon as the subset of state vectors $Z_{IOBoden}$ ($R_{IOBoden}$, l>ls, $T_x$) exceeds the certain number. The determination of fill level information for the container is instead realized with a method, in which only the state vectors F ($Z_{IOBoden}$ ($R_{IOBoden}$, l, t)) that were transformed into a 2-dimensional structure, particularly a digital image, by means of the system-immanent transformation F are subsequently evaluated with an image processing algorithm for object recognition, for example, a BLOb-analysis.

BLOb (English for Binary Large Object) generally is documented in detail in the pertinent literature. In this respect, we refer, for example, to: Lindeberg, T. in "Detecting salient blob-like image structures and their scales with a scale-space primal sketch: a method for focus-of-attention," International Journal of Computer Vision, 11(3), pp. 283-318, 1993; Mikolajczyk, K. et al., in "Scale & Affine Invariant Interest Point Detectors," International Journal of Computer Vision, 60(1), pp. 63-86, 2004; and Ho, E. Y. T in "Resolution improvement and effect of blurring in medical image analysis and computer vision," doctoral thesis, UCL (University College London), 2008.

In the described method, it is important that the BLOb-analysis allows a dynamic detection of individual objects within a freely definable 2-dimensional evaluation area (in this case, the image area $F(Z_{IOBoden})$ that contains the container bottom) and within quantitatively selectable upper and lower limits for the individual object size in real time. In this case, the basic principle essentially is software-based object recognition by means of predefined bright-dark gradient properties of the object edges.

The object count implemented by means of software, e.g., a BLOb-analysis, therefore makes it possible to very accurately determine all objects remaining in a nearly empty container until the container is completely empty.

In order to implement the above-described method in a particularly advantageous fashion, a container for transporting and/or storing objects, particularly piece goods or bulk materials, according to the second aspect is proposed. For this purpose, the container features:

a container bottom and an inner container wall that form an inner container surface, a detection device that is integrated into or arranged on the inner container wall and features, in particular, at least one camera with an optical system and an integrated optical sensor in order to acquire intensity information from the container interior, and a communication interface that is functionally coupled to the detection device and serves for transmitting the acquired intensity information to a processing device;

wherein the inner container surface, particularly the container bottom and/or the inner container wall, is partially or completely realized such that it reflects light particularly well or emits radiation, e.g., UV-radiation and/or IR-radiation, due to activatable 3-dimensional emission processes.

In one particular embodiment, a UV-active and/or IR-active coating or a material, into which UV-activatable or IR-activatable fractions are admixed, is used for the inner container wall and/or the container bottom. This improves the background intensity for objects situated in the container and therefore also the contrast between the objects on the one hand and the inner container surface on the other hand. In a partially filled container, i.e., when the container bottom is still completely covered with or by objects, the inner container surface formed by the inner container wall therefore can be adequately evaluated in contrast to the objects. In an almost empty container, i.e., when the inner container surface formed by the container bottom already is partially visible, the objects lying on the container bottom can, for example, be individually identified in contrast to the container bottom and counted.

As already mentioned in connection with the above-described method, it would be possible to provide certain reference patterns or reference markings such as, e.g., UV-active or IR-active vertical scales and/or horizontal fill level lines and the like, for example, on the inner container wall.

If a UV-active and/or IR-active coating or a material, into which UV-activatable or IR-activatable fractions are admixed, is used for the inner container wall and/or the container bottom, the UV-active and/or IR-active areas of the inner container surface can be reduced to these known reference patterns and reference markings.

The proposed increase of the background intensity achieved with the above-described measures improves the accuracy of the proposed method according to the first aspect. This can be realized with the described UV-active or IR-active surface coating of the container bottom and/or the inner container wall. The UV-active or IR-active container surfaces are illuminated with a corresponding intensity when they interact with UV-radiation or IR-radiation emitted by UV-LEDs or IR-LEDs arranged on the detection device or separately arranged LEDs.

It should be noted that it is also possible to supplement the effect of the inner container surface realized in accordance with the second aspect with a 3-dimensional emission process, e.g., activatable UV-radiation and/or IR-radiation, of the bulk material itself, i.e., of the objects stored in the container, in order to improve the contrast. In this case, not only the state vectors $Z_{IO}(R_{IO}, 1, t)$ of the inner container surface have intensity values l>0, but also the state vectors for the bulk material itself. This makes it possible to significantly generalize the described measuring task.

One practical example for this is the use of IR-active surface properties in combination with IR-sources and IR-filters in the detection device. In this case, the detection device can register the IR-emission of the container walls, as well as of the bulk material itself. The information content recorded in F(Z) therefore becomes more complex. However, the above-described methods for determining the fill level of the container can generally also be applied in this case.

The system according to the third aspect features a plurality of containers, wherein the processing device is designed for detecting the current fill levels of the containers by means of a method according to the first aspect.

The processing device can basically be integrated into the container, for example, into the detection device, and coupled to the detection device via a wire link. The processing device itself can furthermore be connected to a communication device for wireless communication, for example, via WLAN, Bluetooth, Zigbee or the like in order to transmit fill level information to a central administration unit. In this case, the amount of data to be transmitted is correspondingly and significantly reduced. Since wireless data transmission, in particular, is responsible for a large part of the energy consumption, the service life of, for example, batteries that serve as energy source for a detection device implemented in a container module can be extended due to the reduction of the data volume to be transmitted.

An arrangement of the processing device directly on the container, however, requires such a processing device for each container. Consequently, the processing device may also be situated in a unit that is arranged separately of the container, wherein the communication interface between the detection device and the processing device is in this case already realized, for example, in the form of a wireless communication link for transmitting the intensity information acquired from the container interior to the processing device, for example, via WLAN, Bluetooth, Zigbee or the like. Although a larger volume of data needs to be transmitted from a container to the centrally arranged processing device in this embodiment, the processing device may be realized with a correspondingly high computing capacity and upgraded, if so required, e.g., due to an increase in the number of containers to be monitored. In this case, the processing device is coupled to several containers according to the second aspect and respectively determines the current fill level of all containers. The central processing device can then forward the determined fill level data, for example, to an inventory management system for further processing. The central processing device may also form part, for example, of a correspondingly programmed software module, of the inventory management system or consist of a computer that is especially designed for determining the states of occupancy of the containers to be monitored, wherein this computer is coupled to the inventory management system and therefore arranged at an entirely different location than the monitored containers.

The communication between the individual containers and the processing device or the inventory management system, respectively, can be carried out, e.g., via the Internet or a local network (WLAN or LAN), for example, on conventionally secured connections. Such an inventory management system even can be implemented in the Internet, for example, by means of Cloud-Computing, as an auxiliary functionality of the company management, for example, in the logistics system of a globally operating company.

In any case, the detection device is, for example, integrated into the container side wall of a container according to the second aspect or arranged thereon. The detection device may feature an optical system with at least one lens and an integrated optical sensor and be designed for detecting light intensities of points on the inner container surface, i.e., the container bottom and/or the inner container wall and, if applicable, of objects situated in the container. In this case, the detection device is equipped with functional electronics that are designed for carrying out the described methods according to the first aspect.

It should be noted, in particular, that the detection device may consist of a camera known, for example, from smart phones or laptops. Consequently, the term "camera" essentially refers to an optical sensor that is able to record at least still images with a predefined number of pixels, wherein information on the light intensity in the form of a sensor signal is generated for each pixel. In this way, it is relatively easy for the detection device to generate an image with a sufficient number of picture elements or pixels (pixels), i.e., a relatively low resolution, with different brightness values, wherein the detection device also may simply generate a low-resolution black-and-white image.

BRIEF DESCRIPTION OF THE DRAWINGS

The above-discussed solutions are described in greater detail below with reference to the drawings. In this context, the terms "left," "right," "top" and "bottom" refer to an orientation of the drawings with normally legible reference symbols. In these drawings.

DESCRIPTION OF EXEMPLARY EMBODIMENTS

Figure 1:
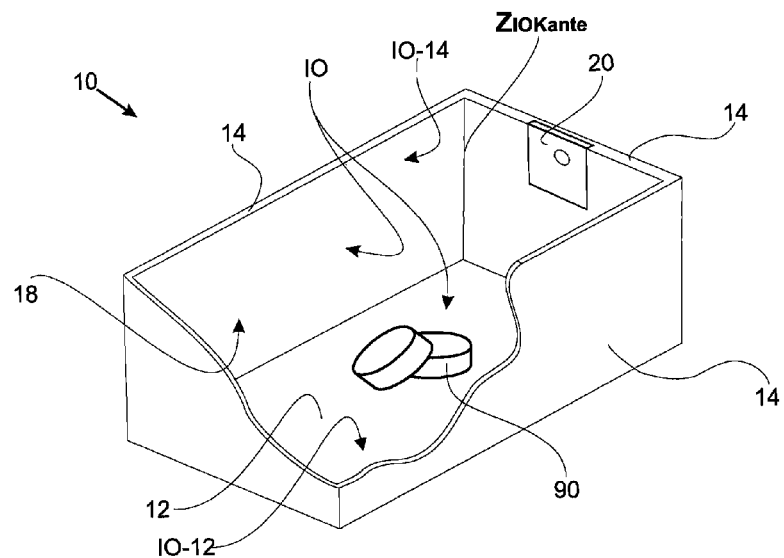
FIG. 1 shows an isometric representation of a first embodiment of a container.

The central idea of the solutions proposed herein concerns the determination of the state of occupancy and/or the fill level of a container for transporting and/or storing objects, particularly piece goods and/or bulk materials. These may consist, for example, of hardware such as screws, nuts or electronic components.

Such a container may, for example, be rectangular, feature a container bottom, as well as a container side wall consisting of four container walls of identical height, and be open at the top. The container may be provided with a hatch on or in the container side wall, e.g., in a container wall that forms the front side of the container.

The container material may consist of metal, wood or even a synthetic material such as, e.g., black plastic and has a relatively smooth surface texture. Other materials naturally may also be considered.

The inner container wall of essentially uniform height and the bottom of the container form a coherent 3-dimensional inner container surface that represents the spatial boundary surface for all objects or articles situated in the container, as well as a boundary surface for all electromagnetic phenomena within the container such as, for example, optical phenomena.

Due to earth's gravity, the 3-dimensional surface also ensures that the container content remains invariable over time without external intervention if the container is suitably positioned, i.e., set up in a sufficiently horizontal position.

In accordance with the central idea, the proposed methods according to the first aspect are based on the fundamental notion that an examination or determination of the container content can essentially be realized with the following approach: looking into the container, estimating the identity and quantity of the bulk material and, if so required, subsequently evaluating the fill level more accurately or, if the container is almost empty, counting all objects situated in the container.

For this purpose, it is essentially proposed to acquire information on a currently visible surface of the inner container wall or, if the container is almost empty, on a visible surface of the container bottom with a detection device that may form part of the container or, in principle, also be situated outside the container.

As long as the container bottom is covered by bulk material, the currently remaining residual quantity, i.e., the current fill level of the container, is estimated by means of a comparison with reference information on the complete 3-dimensional inner container surface.

If the container is almost empty, i.e., if the container bottom already is partially visible, a quantitative evaluation is carried out, wherein the number of remaining objects is precisely determined because the relative counting error becomes more and more important as the number of objects decreases.

This means that the detection of the container content is in this case based on information on the detectable and non-detectable inner container surfaces in combination with information on the bulk material.

For this purpose, a sufficiently accurate 3-dimensional model of the inner container surfaces and the container geometry is generated in order to determine the occupied volume, wherein the number of objects in the container can then be estimated in accordance with the first aspect based on the average volume required by one individual object.

In order to improve the evaluation with respect to the reproducibility, the inner container surface of the container walls and of the container bottom may have properties that can be actively or passively detected with sufficient accuracy by the detection device. In this case, the surface properties of the container bottom and the inner container wall can be detected in a spatially resolved fashion and subsequently compared true-to-scale with the 3-dimensional container model.

In certain embodiments, only surface properties are evaluated that are largely independent of locally changing ambient conditions at the respective location of the container (environmental influences).

According to the first aspect, information on the inner container wall is ignored as soon as the number of components or objects situated in the container is so small that only the bottom surface is entirely or partially covered.

The means for determining the state of occupancy and/or the fill level of the container may be integrated into or arranged on the container side wall of the container or arranged at a location outside the container and separately thereof. In this case, the detection device may be realized in the form of a spatially resolving sensor system that is arranged at a suitable point in or on or outside the container.

A sensor system suitable for this purpose is characterized in that it is able to detect the inner container wall in a complete or collectively complete fashion.

Figure 2:
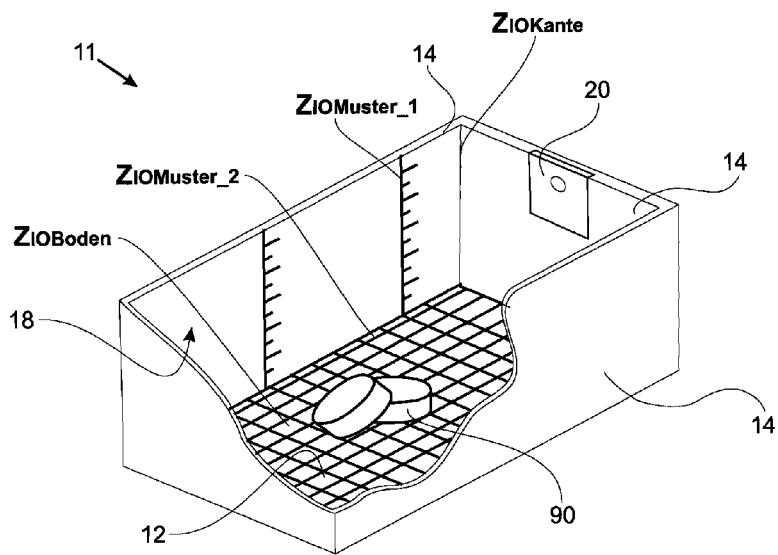
FIG. 2 shows an isometric representation of another embodiment of a container.

For example, the exemplary embodiments of containers 10 described below with reference to FIGS. 1 and 2 are equipped with a detection device 20 that can generate sensor signals for light intensities in the container interior with the aid of an optical system 22 and an integrated optical sensor 24 (see FIG. 3).

FIG. 1 shows a first embodiment of a container 10. In the isometric representation, this container is partially cut open such that the container bottom 12 of the container 10 is visible. The container bottom 12 and the container side wall 14 form an inner container wall 18 with a corresponding inner surface IO that is composed of the inner surface of the bottom IO-12 and the inner surface of the side wall IO-14.

Two objects 90 are situated in the area of the inner container wall 18, i.e., in the interior of the container 10. The container 10 therefore consists of a container for storing or transporting the objects 90 situated therein. The objects 90 schematically represent hardware such as screws, nuts or, e.g., small electronic components or the like.

The container 10 according to the embodiment shown in FIG. 1 features a detection device 20. This detection device 20 is integrated into the inner container wall 18, particularly into the container side wall 14. Referred to the orientation of the container 10, the detection device 20 is arranged on its rear container side wall 14. From this location, the detection device 20 can, in a manner of speaking, see and therefore detect the entire container interior and the majority of the inner container wall 18.

The detection device 20 is designed for generating the sensor signals required for the implementation of a method according to the first aspect, namely intensity information on the container interior. For this purpose, the detection device 20 detects light, particularly color values and/or brightness values, from the interior of the container 10. Referred to the detecting direction of the detection device 20, the objects 90 in the container 10 cover sections or areas of the inner container wall 18 such that the detection device 20 cannot receive any light from thusly covered areas of the inner surface IO.

The detection device 20 basically detects light from the interior of the container 10 that is reflected by all surfaces in the container. In FIG. 1, part of the container bottom 12 is covered by the objects 90. This causes different light intensities in certain areas and the detection device 20 detects these different light intensities in the area of the container bottom 12 (in the situation shown in FIGS. 1 and 2). If the objects 90 within the container 10 have different reflection properties than the inner container wall 18 and the container bottom 12, the thusly achieved contrast basically makes it possible to distinguish between visible areas of the inner surface IO of the container 10 and visible surfaces of the bulk material, i.e., of the objects 90.

The detection of different light intensities results in the detection device 20 generating correspondingly different sensor signals. The fill level of the container 10 can be determined with a method according to the first aspect based on these sensor signals. For this purpose, the sensor signals are transmitted via an interface to a processing device that is not illustrated in FIG. 1 and further processes these sensor signals.

Figure 8:
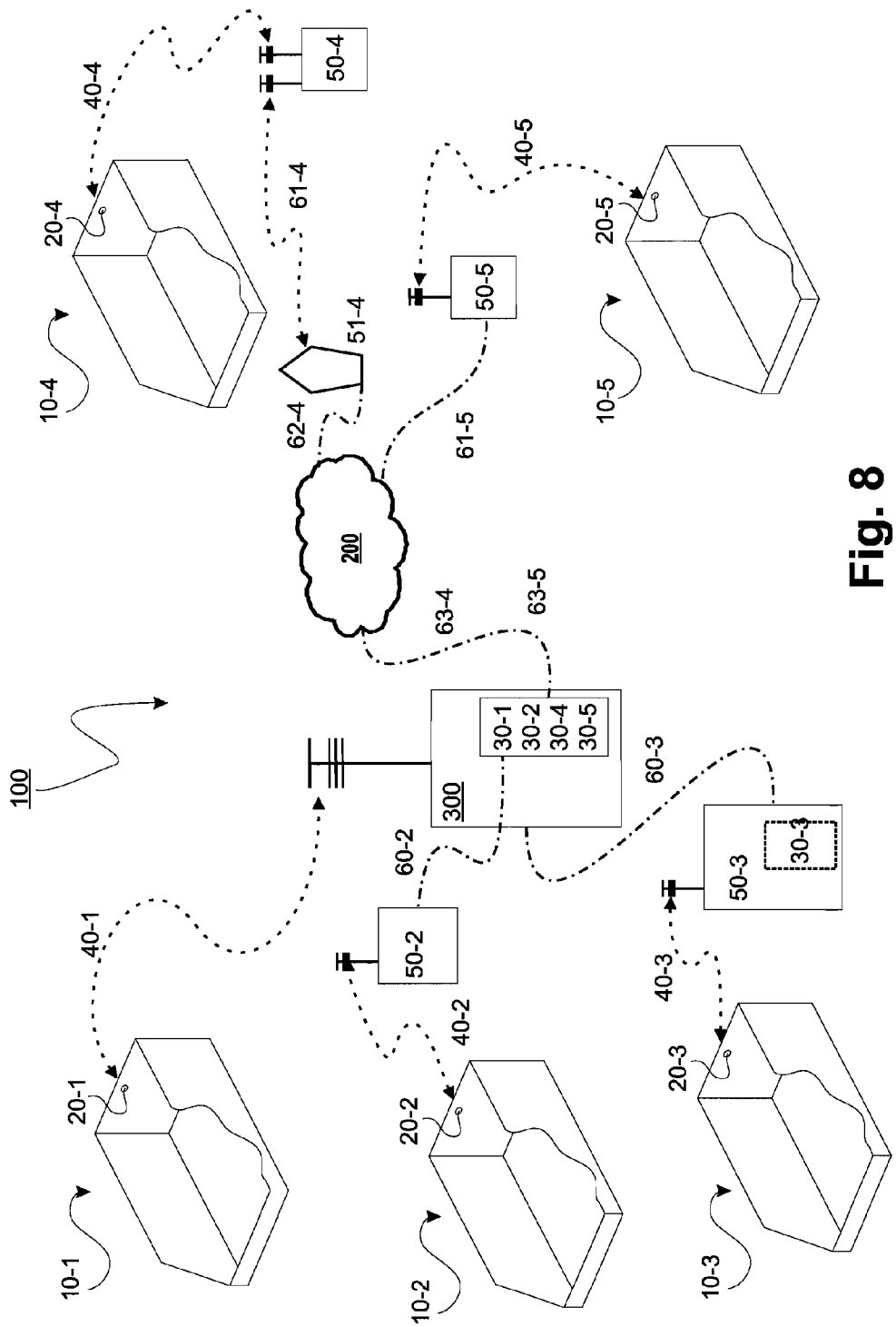
FIG. 8 shows a schematic representation of an embodiment of a monitoring system for dynamically monitoring the fill levels of containers.

As already discussed above, the processing device also may, if so required, be arranged in or on the container 10 and, for example, coupled to the detection device 20 or separately of the container 10 in the vicinity thereof, for example, in the same room or building, or at a completely different location and coupled, for example, by means of a communication link such as, e.g., the Internet. This is discussed in greater detail below in connection with a system according to the third aspect that is illustrated in FIG. 8.

FIG. 2 shows another embodiment of a container 10. This container also features a container bottom 12 and a container side wall 14 that form the inner container wall 18. This container 10 is also partially cut open such that the container bottom 12 is visible. Likewise, only two objects 90 are illustrated in the interior of the container 10 in order to provide a better overview.

The container 10 in the embodiment according to FIG. 2 is largely identical to the container 10 in FIG. 1 such that only the differences between the two containers are discussed. Points or locations that respectively belong to a certain reference pattern subgroup are situated at predefined locations of the inner container wall 18 and the container bottom 12, respectively. These may consist, for example, of all points $R_{IOKante}$ that lie on inner edges of the container 10 and respectively have a corresponding state vector $Z_{IOKante}$ (inner edge reference pattern).

The embodiment according to FIG. 2 alternatively or additionally shows reference pattern subgroups that consist of points on specially marked surface areas of the bottom 12 and/or the inner container wall 18 and respectively have a corresponding state vector $Z_{IOMuster\_1}$, namely a scale that is oriented perpendicular to the container bottom and has level lines extending parallel to the container bottom 12, or $Z_{IOMuster\_2}$, namely a regular grid pattern on the container bottom (marking reference pattern).

Figure 3:
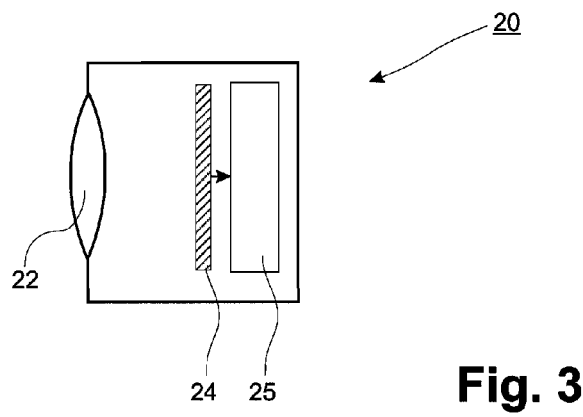
FIG. 3 shows a schematic representation of an embodiment of a detection device in the form of a lateral section.

One possible example is schematically illustrated in FIG. 3 in the form of at least part of the detection device 20. This detection device features an optical system 22 and an optical sensor 24. In the example shown, the optical system 22 consists of a lens, but may, if so required, also consist of a complex optical system, particularly with an autofocus adjustment. An optical sensor 24 is situated in a focal point of the optical system 22, wherein a sufficiently sharp image of a section of the container interior, particularly of the inner container wall 18 and the container bottom 10, is projected on said optical sensor by means of the optical system 22. This means that the optical system 22 and the optical sensor 24 detect a 2-dimensional projection of 3-dimensional, spatially resolved intensity information on the interior of the container 10.

The optical sensor 24 may be realized in different ways. The sensor 24 should essentially be able to transform the intensity information and/or color information on the interior of the container 10 into sensor signals that can be further processed. In the examples described herein, the optical sensor 23 consists of a simple image sensor such as, e.g., a CCD-sensor element or CMOS-sensor element. Such a sensor element can sense at least two different light intensities, i.e., in the simplest case different brightness steps, with a sufficiently high resolution, i.e., with a sufficient number of picture element (pixels) per unit of area. The detection therefore is realized by generating sensor signals that correspond to the respectively detected light intensity of the individual points in the detected 2-dimensional projection of the 3-dimensional, spatially resolved intensity information on the interior of the container 10. In other words, the sensor 24 detects different light intensities that are dependent on the respective location in the container interior in 2-dimensional form, wherein one space coordinate is eliminated. The optical sensor 24 naturally may also be realized in a more complex fashion such as, for example, in the form of an optical sensor that is able to distinguish between any number of different light intensities and/or color values.

The optical sensor 24 may be, in particular, an image sensor that already features an integrated processing unit 25 in the sensor 24 such that the intensity information is available in the form of image information such as, for example, a digital black-and-white (B/W) image, a grayscale image or a color image with the respectively sufficient resolution, i.e., in a form suitable for a method according to the first aspect. For the methods discussed herein, image information in the form of a still image suffices, but it would basically also be conceivable to record several successive images in the form of a virtual film sequence. However, picture or film sequences are only required for a method according to the first aspect under exceptional circumstances.

For the methods according to the first aspect, the container 10 according to the second aspect can be configured such that the container bottom 12 and/or the inner container wall 18 can be distinguished particularly well from objects 90 situated in the container 10.

For this purpose, the container bottom 12 and/or the inner container wall 18 is entirely or partially realized such that a particularly good contrast with respect to the intensity information to be acquired on the container interior is achieved between objects 90 stored in the container and the inner container surface.

For example, the container bottom 12 and/or the inner container wall 18 may be entirely or partially provided with a coating or consist of a material that is UV-active. For this purpose, the container material itself may consist of an amorphous synthetic material that contains fluorescent dyes or UV-dyes at least in the area of the inner container wall 18. UV-dyes of this type are, for example, perylene (for blue, red, orange), naphthalimide (for purple, blue) or the like. These dyes may, for example, be admixed to synthetic resin such that a UV-active layer can be produced on the inner container wall 18 in the form of a lacquer layer consisting, for example, of Paraloid B-72 that contains an admixed fluorescent dye and is dissolved with ethyl acetate; Paraloid B-72 is an acrylate ester polymer that makes it possible to produce water-white, transparent coatings with excellent resistance to heat and chemicals.

Such a UV-active material absorbs UV-radiation that can be emitted, for example, purposefully by one or more sources such as, e.g., UV-LEDs. This radiation can be emitted into the container interior, particularly onto the container bottom 12 and the inner container wall 18, directly or indirectly, e.g., via a mirror, briefly in the form of a UV-flash or for a certain time period or, if applicable, even permanently. The UV-active material is excited by the radiation and emits light in a defined wavelength range of the UV-spectrum and/or visible spectrum that can be registered in a spatially resolved fashion in the form of an image by the detection device 20. Particularly good results were achieved with dyes or color pigments used in signal colors for reflecting surfaces of traffic signs.

The surface areas of the bottom 12 and of the inner container wall 18 that are shaded by objects 90 situated in the container, as well as surfaces that are not provided with UV-active material, remain inactive in this case and correspond to the darker areas in a recorded image. This also applies to the bulk material if the surface properties of the objects 90 are correspondingly taken into account.

It is alternatively or additionally possible—as already mentioned in connection with FIG. 2—to realize special geometries or patterns in the optical properties of the inner container surface, for example, by correspondingly applying a UV-active coating. Such geometries or patterns (marking reference patterns) may be realized in the form of scales, graduations, fill level lines or simple auxiliary patterns on the inner container wall 18 and/or the container bottom 12 as illustrated in FIG. 2.

As an alternative to the already described UV-active coating of the bottom 12 and the inner container wall 18, it would also be possible to realize the container bottom 12 and/or the inner container wall 18 much more dull than the objects 90 situated in the container 10 and/or such that they essentially reflect hardly any or only little radiation and, in particular, rather absorb said radiation.

In addition, other interfering wavelength ranges of the surroundings can be suppressed by utilizing suitable filters in the optical system 22 of the detection device 20, e.g., wavelength filters, polarization filters or the like. The UV-sources, the detection device 20 and other optical components such as mirrors, lenses, filters, windows, optocouplers and the like may be realized in the form of electronic components. In this case, the effect of lenses and filters may also be implemented with corresponding software and thusly integrated into a virtually intelligent detection device 20.

For example, a miniature camera that is realized similar to cameras integrated into laptops or mobile telephones may be used as detection device 20. Such a camera can be directly mounted on a printed circuit board and equipped with a lens, aperture control, autofocus adjustment and/or special filters in order to optimize the image quality under different ambient conditions and to select special wavelength ranges. It would be conceivable, for example, to realize a microprocessor-controlled aperture control that is integrated into the processing unit 25 and makes it possible to adapt the detection device 20 to a changing dynamic range of the intensities to be acquired on the container interior. In addition, one or more IR-LEDs or UV-LEDs may be provided on the same printed circuit board as the camera and also emit corresponding radiation into the container interior in a microprocessor-controlled fashion. This may take place in the form of flashes.

As indicated in FIGS. 1 to 3, the detection device 20 may be integrated into one of the container side walls 14 of the container 10 in the form of a protected module, particularly in a removable fashion. The module may be realized, e.g., in an encapsulated fashion such that live components or inner moving parts, e.g., of the optical system 22 are completely protected against accidental contact and against the admission of water (e.g., class IP66 protection). For this purpose, the detection device 20 may be arranged in the inner container wall 18, for example, behind a transparent protective window. In this case, all optical information is received by the detection device 20 through the transparent protective window (light emitted or reflected by the container bottom 12 or the inner container wall 18) or emitted through said transparent protective window for illumination purposes (UV-radiation). Incident radiation can be projected onto the optical system 22 and then onto the sensor 24 by means of upstream filters. In this case, the protective window already may have certain filter properties with respect to the interesting wavelengths.

In order to broaden the field of vision, the beam path of the optical system may also extend indirectly, for example, via a mirror with double-concave shape between the protective window and the optical system 22. In this way, the surfaces of the bottom 12 and of the inner container wall 18 including the bulk material also can be optimally detected directly underneath and to the right and the left of the location, at which the detection device 20 is installed, i.e., by minimizing blind zones in the corners of the container 10.

With respect to the processing unit 25 that, if applicable, is integrated into the detection device 20, it should be noted that the intensity signals detected by the sensor 24, for example, a camera semiconductor chip in the form of a CMOS-sensor or CCD-sensor, are converted into digital signals by an A/D-converter integrated into the sensor 24 or the processing unit 25. This makes it possible to generate the sensor signals in the form of a digital image of the container interior with sufficient resolution within the correspondingly chosen wavelength range. A memory may furthermore be provided in the processing unit 25 in order to temporarily store this intensity information in the form of a digital image in accordance with the requirements of one of the methods according to the first aspect. This digital image information can also be condensed into a conventional compressed image format that is subsequently available in the memory for further processing in the processing unit 25 or a processing unit 30 that is also integrated into the detection device 20 or for the wireless transmission to a processing device 30 arranged outside the container 10.

An intelligent detection device 20 therefore may contain A/D-converter(s), random access and read-only memories (RAM and ROM), components of the optical system 22, a programmable control unit, e.g., a microprocessor that, if so required, is also integrated into the processing unit 25 and serves for the sequential control of the diverse functions, a timer for the timed sequential coordination and for generating time stamps and a communication device that includes a transceiver and serves for the bidirectional wireless data transmission to a relay station or intermediate station 120 or to a receiver 110 of a processing device 300 (see FIG. 8).

Firmware and/or software is also implemented in the different digital components of the processing unit 25 integrated into the detection device 20 and comprises at least all module-specific control and evaluation functions.

A bidirectional wireless transmission can be conventionally realized with the aid of an antenna or an optical communication interface. The bidirectional data transmission also makes it possible to program the detection device 20 in the form of a container module, for example, with a service module.

The energy supply of the detection device 20 and, if applicable, the plurality of UV-LEDs for generating the UV-radiation can be realized with batteries in order to achieve a mains-independent energy supply. The batteries may be accommodated in a separate compartment, for example, on the lower end of the container module with the detection device 20. The compartment may be provided with a cover in order to protect the batteries from external access and environmental influences. The batteries can be easily replaced with new batteries on demand (e.g., when they are discharged), for example, in a distribution center.

Figure 4:
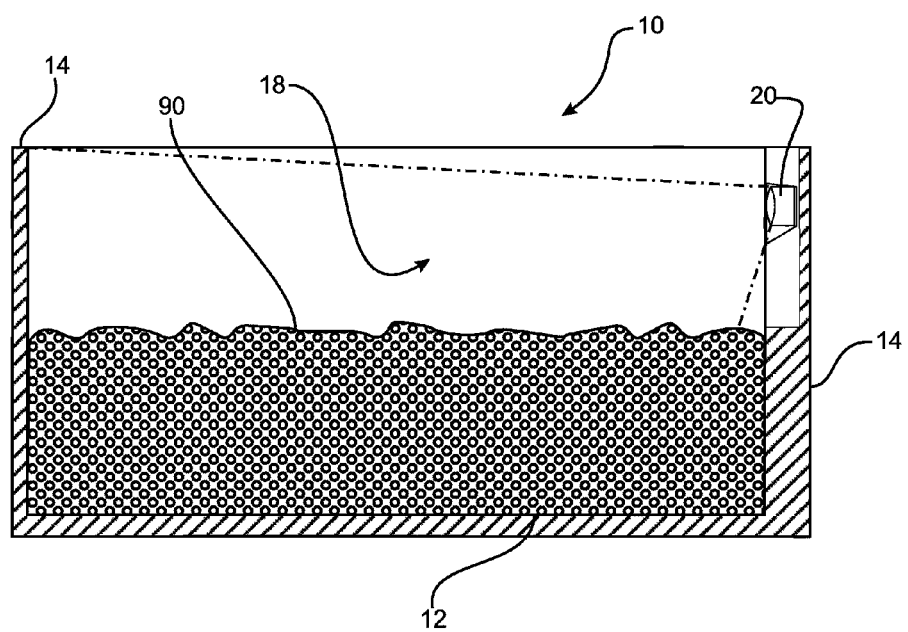
FIG. 4 shows a representation of the acquisition of intensity information from the interior of a container with a detection device according to FIG. 3 in the form of a lateral section.

FIG. 4 schematically shows a possible embodiment of a detection device 20 that is integrated into the container side wall 14 of the container 10. As described above, the detection device 20 is equipped with a camera in this case and detects at least a section of the inner container wall 18 of the container 10 that suffices for a method according to the first aspect with this camera. An unknown number of objects 90 are situated in the container interior of the container 10 and the container therefore has an unknown fill level that needs to be determined.

The optical system of the detection device 20 acquires intensity information by receiving reflected electromagnetic radiation from the container interior. In other words, light incident into the interior of the container 10 is reflected by the inner container wall 18 and by the container bottom 12 that is not covered by the object 90 or incident radiation activates a UV-active coating provided, if applicable, on the bottom 12 and/or on the inner container wall 18 such that the activated surfaces correspondingly emit UV-light.

In FIG. 4, two light beams detected by the detection device 20 are illustrated in greater detail with dotted and broken lines. These light beams also mark the section of the container interior that can be detected by the detection device 20. The light beams from the container interior that are detected in this fashion by the detection device therefore may, in principle, originate from a point on the inner container surface or on the surface of an object 90 situated in the container 10. In other words, the detection device 20 transforms all 3-dimensional, spatially resolved intensity information on the container interior into a 2-dimensional projection, i.e., into a digital image in this case.

Figure 5:
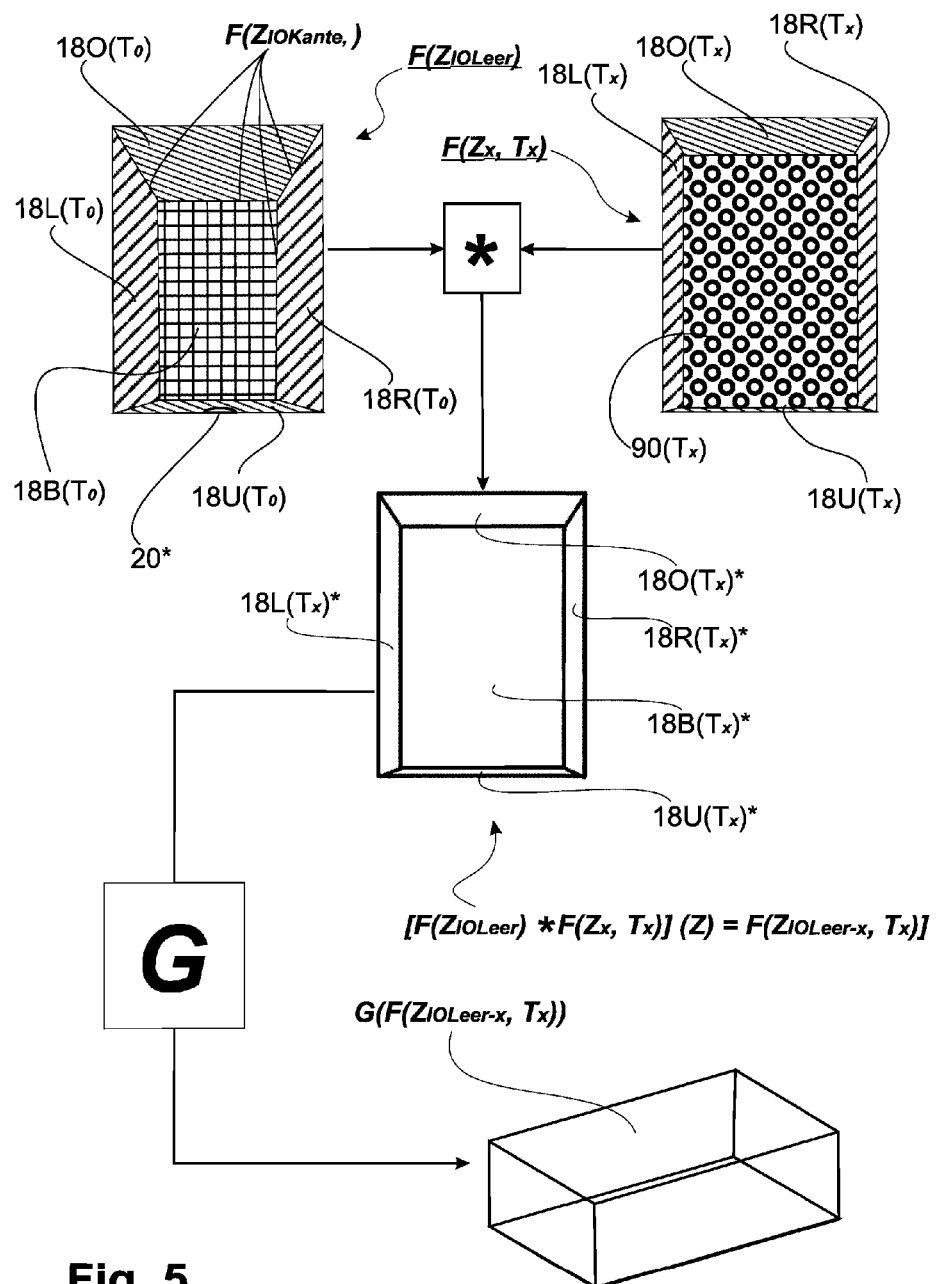
FIG. 5 shows a schematic representation of the determination of fill level information on the container based on processing at least part of the detected actual state intensity information $F(Z_x, T_x)$ by interrelating this information to adjacent reference intensity information $F(Z_{IO}, t_0)$.

A possible implementation of the methods for determining the fill level of a container 10 is described in detail below with reference to FIGS. 5 and 6.

State vectors $Z(R, l, t)$ are defined for all points within the container volume. In this case:

R describes the location sector (in the form of three orthogonal space coordinates x, y and z);

l describes the intensity status or the intensity at the location R, in the simplest case with a value range "l=1" (active) and "l=0" (inactive) depending on whether or not an emission of radiation or a reflection of radiation takes place at the location R; if a higher intensity resolution is required, l can assume any values between 0 and 1; and t describes the time; the capital letter T always stands for a certain point in time.

In one method according to the first aspect, a first special case exists for all points $R_{IO}$ on the inner surface IO of an empty container 10 (see FIGS. 1 and 2). The state vectors $Z_{IO}(R_{IO}, l, t)$ of this subgroup then can have an intensity value greater than zero (l>0) if three required conditions are also met, namely that i) the respective point can receive radiation, e.g., light such as, for example, UV-radiation generated by LEDs;

ii) the respective point R emits radiation that can be detected by the detection device 20, for example, in the form of reflected light and/or has activatable radiation-emitting properties, e.g., UV-active properties; and iii) the radiation reflected or emitted by the respective point R according to i) and ii) is not absorbed or blocked on the optical path to the detection device 20.

Another special case that is interesting in this context is the subgroup of all points $R_{IOKante}$ that lie on the inner edges of the container 10 and have corresponding state vectors $Z_{IOKante}$ ($R_{IOKante}$, l, t) (see FIG. 2).

State vectors of specially marked surface areas of the bottom 12 and/or the inner container wall 18 such as, e.g., UV-active vertical scales, horizontal fill level lines and the like (see FIG. 2) likewise may represent special cases—as also described with reference to FIG. 2.

Initially, an abstract model of the container 10 is generated, wherein said model can virtually be used as a lower calibration point (i.e., as reference model for the maximum available container volume) in the determination of the fill level of the container 10.

For this purpose, an empty container 10 is used that, in order to improve the contrast, also may partially or entirely have activatable radiation-emitting properties such as the aforementioned UV-active or IR-active properties on the inner surface, i.e., the container bottom 12 and the inner container wall 18, in accordance with the second aspect. In this case, UV-light such as, for example, a UV-flash is generated by means of UV-LEDs that, if applicable, are arranged on the detection device 20 in order to activate the radiation-emitting properties of the correspondingly realized inner surfaces IO, i.e., to excite these inner surfaces such that they emit UV-radiation. Immediately after the generation of the UV-light, a detection of the container interior is carried out by means of the detection device 20 at an (initialization) time $T_0$.

Consequently, the result is a distorted digital image of the container interior of the empty container 10 and therefore the inner surface IO detected by the detection device 20. This image contains areas that correspond to the areas of the inner container wall 18, namely $18O(T_0)$, $18U(T_0)$, $18L(T_0)$, $18R(T_0)$ and $18B(T_0)$. This digital image is stored or intermediately stored in a memory of the detection device 20. In other words, a 2-dimensional projection of the 3-dimensional, spatially resolved reference intensity information $F(Z_{IO}, T_0)$ on the inner surface IO of the container 10 was carried out in an empty state at the time $T_0$.

Depending on the choice of the location, at which the detection device 20 is installed, a system-immanent function of representation $F(Z_{IO}, t_0)$ of the detection device 20 is applied to all state vectors $Z_{IO}(R_{IO}, I, T_0)$ in this approach. This leads to the more or less distorted 2-dimensional projection of the 3-dimensional, spatially resolved intensity information. In other words: the detection device 20 integrated into the container 10 generates an abstract 2 dimensional representation of the 3-dimensional reality. In this case, one space coordinate is eliminated.

The 2-dimensional projection realized by means of the system-immanent function of representation $F(Z_{IO})$ has the same information content as the 3-dimensional reality. No information loss occurs due to the essentially invariant properties of the inner container surface, i.e., of the bottom 12 and the inner container wall 18, as well as of the detection device 20 itself. It can be assumed that the relevant time periods for a method according to the first aspect are so short that the properties of the container and of the detection device can be considered to be time-independent. In any case, this is usually ensured if the reference model is newly generated prior to each refilling of the container. This means that the system-immanent function of representation $F(Z_{IO}, t_0)$ can be assumed to be time-invariant for the relevant time periods.

This means that $F(Z_{IO}, t_0)=F(Z_{IO}), t)=F(Z_{IOleer})$ applies to all $T_x+T_0>t>T_0$.

The time-variant fill level of the container 10 can now be determined based on this 2-dimensional reference projection $F(Z_{IOleer})$, i.e., an image, of the empty container 10.

For this purpose, a subgroup $F(Z_{IOKante})$ that contains all points lying on the inner edges of the container is initially separated (see FIG. 5) based on a 2-dimensional equivalent of the empty container 10 in the form of the 2-dimensional reference projection $F(Z_{IOleer})$. This can be realized in the processing device 30 (see FIG. 8), for example, by means of a software routine that is specially set up for this purpose, wherein this software routine extracts and subsequently transforms this subgroup into an abstract 3-dimensional representation of the empty container 10.

This mathematically represents another transformation $G(F(Z_{IOKante}))$, wherein the state vector G no longer needs to contain any intensity information at this point, but rather merely represents a model of the container 10 in the form of an abstract three-dimensional "grid structure." This grid structure can be calibrated with respect to its length, width and height with the actual dimensions of the container 10. The 3-dimensional model of the empty container 10 is illustrated in the form of $G(F(Z_{IO}))$ on the left side in FIG. 6.

At this point, it should be noted that information on the function of representation F(Z) is not important and that merely the transformation G(F) needs to be implemented in the software of the detection device 20 or a processing device 30 or evaluation device set up for this purpose.

As mentioned above, the 2-dimensional projection $F(Z_{IO})$ can be newly determined prior to each refilling of the container 10 in practical applications, i.e., a digital image of the inner surface IO of the container 10 can be generated and stored. In this way, possibly existing time variances that are caused, for example, by damages or changes to the surface properties of the inner container wall 18 can be taken into account and the accuracy of the fill level measurements therefore can be ensured.

A fill level measurement according to the first aspect can now be realized based on the calibrated, abstract 3-dimensional model of the container 10 in digital form.

For this purpose, a digital image $F(Z_x, T_x)$ of the interior of the container 10 that is filled to a still unknown level (fill level) is generated by means of the detection device 20 at a time $T_x$ in accordance with the above-described approach, for example, as illustrated in FIG. 3. In other words, a 2-dimensional projection of 3-dimensional, spatially resolved actual state intensity information $F(Z_x, T_x)$ on the interior of the container 10 filled to the still unknown current fill level is now carried out.

Due to shading, all areas of the inner surface IO of the container 10 that are covered by bulk material, i.e., objects 90 situated in the container 10, appear dark or darker than the registered radiation of non-covered areas of the bottom 12 and the container side wall 14. This is illustrated on the upper right side in FIG. 5. The result is a distorted digital image of the container interior of the container 10 that is filled to an unknown fill level and therefore of the areas of the visible inner surface IO and the bulk material surface $90(T_x)$, i.e., of the objects 90 situated in the container 10, detected by the detection device 20. This image is composed of areas that correspond to the inner surface IO formed by the container side wall 14, namely $18O(T_x)$, $18U(T_x)$, $18L(T_x)$, $18R(T_x)$, and by the bulk material surface $90(T_x)$.

Normally all registered intensity values physically originate exclusively from the still visible areas of the inner surface IO that are formed by the container side wall 14 and the dark surface of the objects 90 with a relatively complex shape. This means that the bottom 12 of the container 10 is not completely covered with bulk material or the objects 90, respectively.

A distinction between light from the inner surface IO of the container 10 and light from the objects 90 can be adjusted during the detection, for example, with a contrast limit in the form of a correspondingly predefined intensity threshold. In this way, it is possible to eliminate all remaining volume state vectors of the objects 90 during the transformation $F(Z_x, T_x)$ and to thusly smooth the, if applicable, complex surface of the objects 90. The acquired image $F(Z_x, T_x)$ is also transmitted to the processing device 30 for further processing.

Inverse state vectors $F(Z_{IOleer-x}, T_x)$ for the still visible areas of the inner container surface IO are now calculated within the same state space, for example, in the processing device 30 in accordance with the first aspect, namely by applying a convolution operation or correlation operation of all state vectors of the empty container $F(Z_{IOleer})$ to the also transformed state vectors of the container $F(Z_x, T_x)$ filled to an unknown fill level. This means that $$[F(Z_{IOleer})*F(Z_x,T_x)](Z)=F(Z_{IOleer-x},T_x)$$

applies to all state vectors Z in the container 10. The result is illustrated in the center in FIG. 5. This result is a distorted digital image of the unoccupied volume of the container interior of the container 10, i.e., of the portion of the container interior that is detected by the detection device 20 and bordered laterally by the visible areas of the inner surface IO and on the bottom by the surface formed by the bulk material. The thusly obtained image is composed of areas that correspond to the inner surface IO formed by the visible container side wall 14, namely $18O(T_x)*$, $18U(T_x)*$, $18L(T_x)*$ and $18R(T_x)*$, and to the virtual bottom surface $18B(T_x)$.

The above-discussed transformation G is then used for also projecting these inverse state vectors into the 3-dimensional space of the abstract container model, in which they subsequently represent the empty net volume in the filled container true-to-scale in the form of $G(F(Z_{IOleer-x}))$ as illustrated on the lower right side in FIG. 5 and in the center in FIG. 6.

Figure 6:
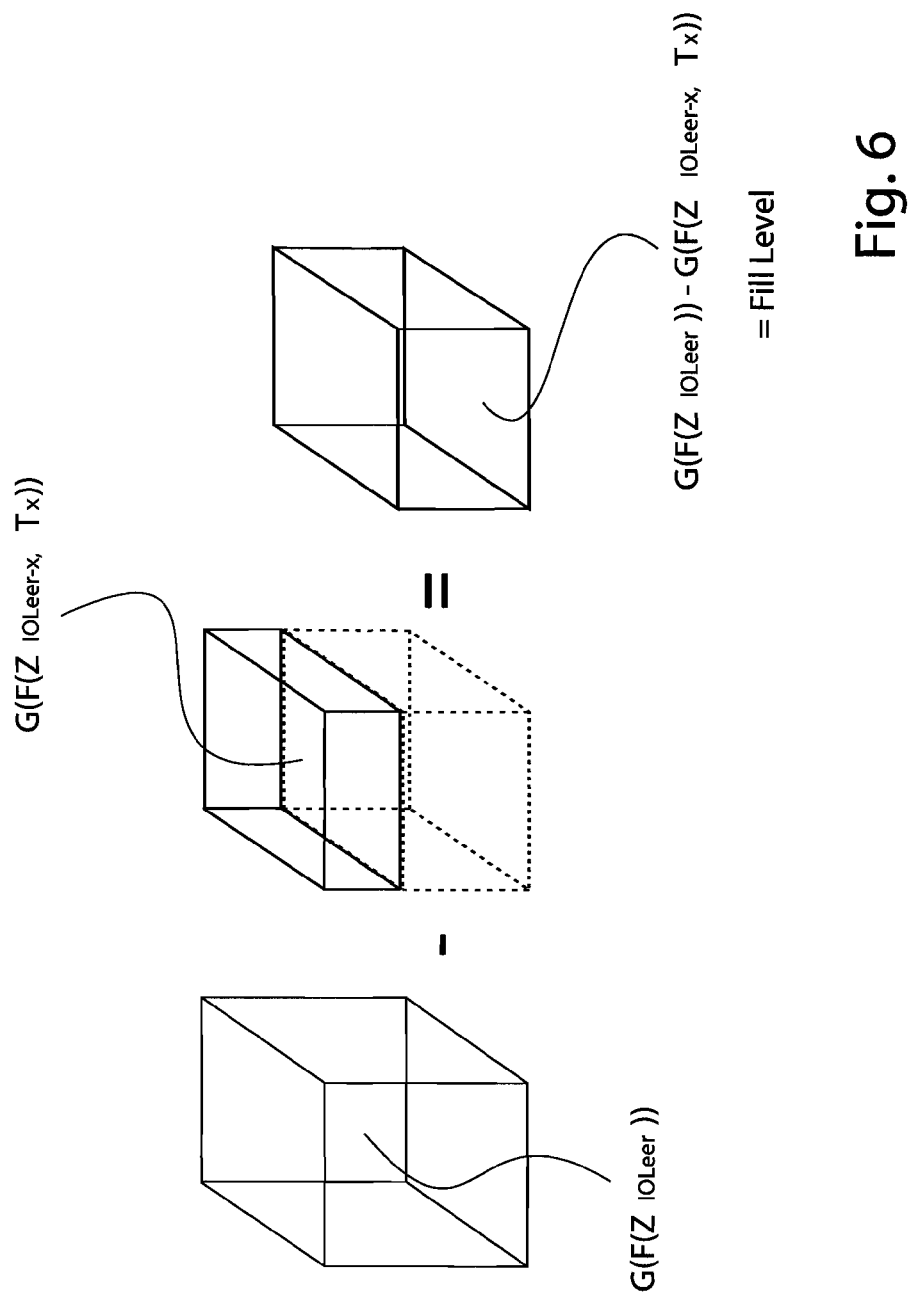
FIG. 6 shows a schematic representation of the determination of the still filled container volume.

First information on the fill level (fill level information) of the container 10 is now essentially determined in the form of a quantitative dimension at the detection time $T_x$ by means of a simple subtraction of the empty net volume of the filled container, i.e., $G(F(Z_{IOleer-x}))$, from the volume of the empty container, i.e., $G(F(Z_{IOKante}))$, wherein this first information is illustrated in the form of $G(F(Z_{IOleer}))-G(F(Z_{IOleer-x}, T_x))$ on the right side in FIG. 6 and represents the current fill level.

Information on, in particular, the average volume required by an object or a certain number of objects 90 can be used for estimating second fill level information on the container 10 in the form of the number of objects 90 situated in the container by means of a division (dividing) of the occupied volume by the volume required by an object 90 or by the volume required by the certain number of objects 90 and a subsequent multiplication with this certain number.

The information on the empty net volume naturally can also be used for estimating the currently remaining residual quantity by determining how many objects 90 fit into the empty net volume in the above-described fashion and subtracting the thusly obtained number from the number of a completely filled container. In this context, the container actually never needs to be completely filled because only the quantity that can be theoretically accommodated in the empty volume of the container 10 needs to be calculated in order to determine the remaining residual quantity; this value can already be stored in the detection device 20, for example, during the course of the initialization of the container module by means of the detection device. The quantity of objects 90 that can be theoretically accommodated may be calculated based on the empty container volume and the aforementioned values for the volume required by one object 90 or the volume required by a certain number of objects 90. The subtraction illustrated in FIG. 6 therefore can be eliminated.

After the described evaluation process according to the first aspect is completed, the image $F(Z_x, T_x)$ is stored together with the corresponding fill level information and a time stamp T. This makes it possible to carry out subsequent evaluations such as, for example, a comparison of image data and to derive a dynamic consumption profile thereof. For this purpose, the functions of the respective time stamps $T_x$ in the form of the fill levels determined at different times merely need to be plotted as a function of the time t. The storage of the digital image furthermore allows a subsequent remote inquiry of the actual status of the container 10 as a function of the time.

In an additional development of the method and the container 10, a vertical scale and/or a few level lines are provided on the inner container wall 18 as shown in FIG. 2. In this context, it would also be possible to reduce the aforementioned areas of the inner container surface that actively emit radiation to this vertical scale, level lines and/or reference patterns.

This additionally simplifies the discussed convolution operation or correlation operation according to the first aspect because the state vector quantity Z(R, I, t) for the empty container 10, as well as for the partially filled container 10, is significantly reduced, i.e., the computational effort is correspondingly reduced.

If a single vertical scale, in particular, is provided on the inner container wall 18, the computational effort can be reduced to a 1-dimensional problem: the length of the entire scale when the container 10 is empty minus the length of the still visible part of the scale when the container 10 is partially filled.

The described measuring task furthermore can be significantly generalized, e.g., by replacing or supplementing the reflecting and emitting inner surfaces of the container with 3-dimensional emission processes of the bulk material, i.e., of the objects 90. In this case, not only the state vectors $Z_{IO}(R_{IO}, I, t)$ of the inner surface IO of the container 10 have intensity values I greater than zero, but also the state vectors for the volume of the bulk material itself.

One possible example for this embodiment is the utilization of infrared (IR)-active surface properties in combination with corresponding IR-sources such as, e.g., IR-LEDs and IR-filters in the detection device 20.

In this case, the detection device 20 registers the IR-emission of the container walls, as well as of the bulk material itself. Although this causes the information content recorded in F(Z) to become more complex, the above-described method for determining the fill level can generally also be applied in this case.

Although the method according to the first aspect described herein is, with respect to the accuracy of the result, very well suited for a container 10 with completely covered container bottom 12 because this usually makes it possible to assume that a sufficient residual quantity remains, a relevant dimensional error may still occur as initially discussed once the container bottom 12 becomes partially visible. One reason for this is the reduction of the measuring task to a virtually 2-dimensional problem.

When the container 10 is almost empty, the number of objects 90 remaining in the container should be determined as accurately as possible in order to place a reorder at an ideal time. The reliable detection of a completely empty container 10 is of particular interest.

In order to take this fact into account, the evaluation of the intensity information on the interior of the container 10 is changed in the method according to the first aspect proposed herein as soon as a certain portion of the container bottom 12 is visible. This can be practically implemented in the control of the method described herein in the form of a second routine in a software module.

Figure 7A:
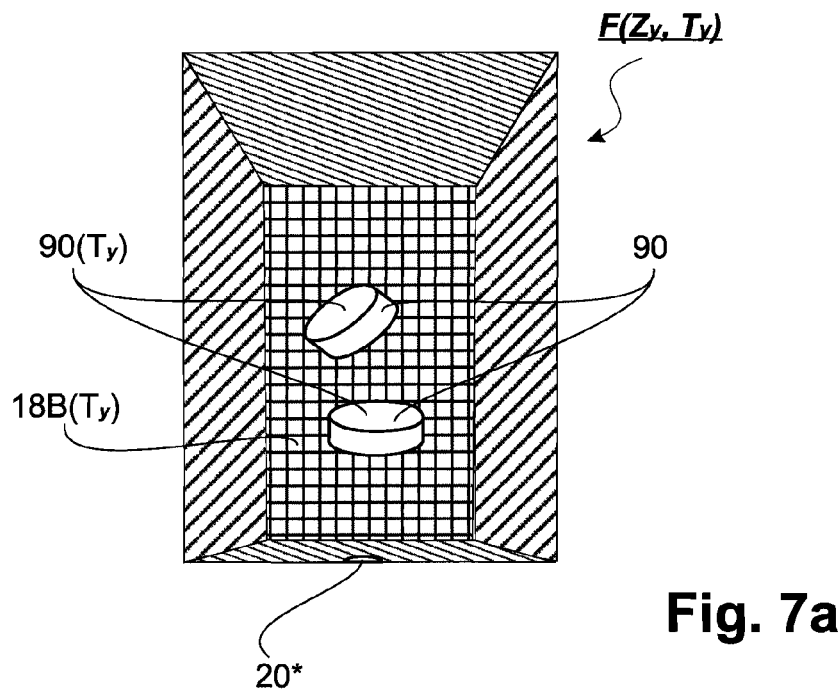
FIGS. 7a, 7b show a schematic representation of the determination of the number of objects remaining in the container when the container bottom is already visible.
Figure 7B:
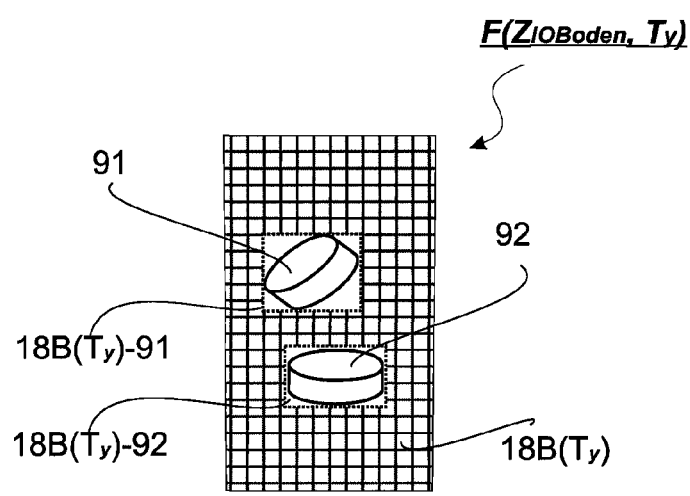

A possible embodiment of the second routine of the method according to the first aspect is illustrated in FIGS. 7a and 7b.

The second routine is respectively activated or applied if the first routine of the above-described fill level measuring method according to the first aspect identifies a certain number of state vectors $Z_{IOBoden}(R_{IOBoden}, I, T_y)$ of the container bottom 12 that have an intensity value greater than zero at a detection time $T_y$. In this case, a certain portion of the container bottom 12 is already visible, i.e., no longer covered by object 90, and therefore indicates that only a few objects 90 remain in the container interior. For example, the intensity information $F(Z_y, T_y)$ on the container interior that is illustrated in FIG. 7a and acquired by means of the detection device 20\* shows that only two objects 90 remain in the container. Consequently, a majority of the inner surface IO formed by the container bottom 12 is already visible.

Consequently, the aforementioned fill level calculation according to the first aspect is completely eliminated soon as a subset of state vectors $Z_{IOBoden}(R_{IOBoden}, I>), T_y)$ exceeds a defined threshold. In this case, the second routine is applied instead, wherein only the state vectors $Z_{IOBoden}(R_{IOBoden}, I, T_y)$ are transformed into a 2-dimensional projection, i.e., an image, by means of the system-immanent transformation F. This is illustrated in FIG. 7b. In this figure, only the portion $18B(T_y)$ of the intensity information $F(Z_y, T_y)$ on the container interior formed by the container bottom 12 is shown.

Subsequently, this image $F(Z_{IOBoden}, T_y)$ is evaluated by means of an image processing method in the processing device 30 (see FIG. 8), in the detection device 20 of the container module itself or outside the container 10, i.e., remotely.

One image processing method suitable for this purpose is the aforementioned BLOb (Binary Large Object)-analysis that, for example, is documented in greater detail, among other things, in the above-cited literature.

In the application described herein, it is merely important that a dynamic detection, i.e., an identification, of individual objects is carried out within a freely definable 2-dimensional evaluation area (in this case, in particular, $F(Z_{IOBoden}, T_y)$ and within quantitatively selectable upper and lower limits for the individual object size, if possible in real time. The basic principle is software-based object recognition by means of predefined bright-dark gradient properties of the object edges.

FIG. 7b shows that the BLOb-analysis has respectively identified predefined bright-dark gradient properties of the edges of the objects 91, 92 for the respective areas of the container bottom $18B(T_y)$-91 and $18B(T_y)$-92. The thusly identified objects 91, 92 can then be individually counted such that the fill level (information) in the form of the residual quantity remaining in the container can be determined as accurately as possible.

In this context, the increased background intensity proposed in connection with a certain embodiment of the container 10 according to the second aspect improves the accuracy. This can be achieved with the described UV-active and/or IR-active surface coating or material property of the bottom 12 and/or the inner container wall 18. The IR-active or UV-active inner surfaces IO are intensely illuminated when they interact with the UV-radiation emitted by corresponding LEDs of the detection device 20 or separately arranged LEDs.

During the object recognition by means of image processing such as the exemplarily cited BLOb-analysis, all objects 90 that still remain in the almost empty container can be identified and thusly counted until the container is completely empty.

FIG. 8 schematically shows an example of a monitoring system 100 that forms part, for example, of an inventory management system or warehousing system. The system comprises, among other things, the individual containers 10-1, 10-2, 10-3, 10-4 and 10-5 that already were extensively described in connection with FIGS. 1 to 3 and the method according to the first aspect illustrated in FIGS. 5 and 6. In the monitoring system 100, the arrangement of the processing device 30 within the system is of primary interest for the method according to the first aspect and a container according to the second aspect.

Communication links between the individual containers 10-1, 10-2, 10-3, 10-4 and 10-5 and elements of the system 100 are indicated with broken lines.

The detection device 20-1 of the container 10-1 is directly connected to a central computer 300 via a wireless radio link. In this case, the processing device 30-1 forms part of the central computer 300, on which an inventory management system (WWS) such as, for example, SAP or the like is implemented. The processing device 30-1 may be implemented in the form of a software routine of the WWS.

Only the communication required for determining the fill level of the containers is described below as part of the proposed solution for dynamically monitoring the fill level in containers of the system 100.

Each time the detection device 20-1 of the container 10-1 acquires the intensities from the interior of the container 10-1—which may take place during the initialization of the container 10-1 prior to each filling process or during the emptying of the container—the detection device 20-1 transmits the acquired intensity information to the processing device 30-1 in the central computer 300 via the wireless interface 40-1. The information is then processed in the processing device in order to determine the fill level in accordance with the first aspect.

The configuration described in connection with the container 10-1 can be realized in a small business operation such as, e.g., an automobile repair shop with a directly connected storage area or workshop area, in which the containers 10-1 to be monitored are arranged.

In larger business operations or storage facilities, a direct radio link with the containers may possibly not be sensible. Consequently, the container 10-2 is, for example, connected to a wireless access point 50-2 via a radio link 40-2 and the wireless access point is in turn connected to the central computer 300 of the WWS and therefore to the processing device 30-1 implemented therein via a wire-bound communication link 60-2.

In order to relieve the central computer 300 from the tasks of the processing device 30-1, for example, when a very large number of containers needs to be monitored, the processing device 30-3 is directly arranged at the wireless access point 50-3 for the container 10-3. In this case, the wireless access point 50-3 may consist of a computer with a corresponding wireless interface, in which the processing device 30-3 is also implemented in the form of a software program. Alternatively, a remote computer that fulfills the function of the processing device 30-3 may be connected to the wireless access point 50-3. In any case, the generated fill level information on a container 10-3 is forwarded to the central computer 300 and therefore to the WWS implemented thereon, for example, via a wire-bound communication link 60-3.

Another option is illustrated in the form of the container 10-4 that is located, for example, at a mobile site or in a transport vehicle such as, e.g., a vehicle, train, aircraft or ship. For this purpose, the detection device 20-4 of a container 10-4 is connected to a wireless access point 50-4 arranged within radio range at the mobile site or in the transport vehicle via a wireless interface 40-4. In this case, the wireless access point 50-4 also communicates with the processing device 30-3 in the central computer 300 via a wireless interface 61-4 with a wireless access point to a public or private or virtual private (VPN) data network such as, for example, the Internet 200, wherein the central computer is connected to the data network, for example, via a wire-bound communication interface 63-4. In this way, the WWS is also able to dynamically monitor the fill levels of mobile containers 10-4.

In addition, a stationary storage facility that is located remotely from the central computer 300 of the WWS can also be connected via an intermediate public or private or virtual private (VPN) data network such as, for example, the Internet 200. For this purpose, the wireless access point 50-5 is connected to the data network, for example, in a wire-bound fashion by means of a communication interface 61-5, wherein the central computer 300 with the processing device 30-5 is connected to said data network by means of a wire-bound communication interface 63-5. In this case, a detection device 30-5 of the container 10-5 transmits the acquired intensity information on the interior of the container 10-5 via the wireless access point 50-5.

Individual configuration characteristics of all communication paths described in connection with the containers 10-1 to 10-5 naturally can be combined. For example, the respective processing device 30-1 to 30-5 can also be directly arranged on the detection device 20-1 to 20-5 of the respective container in all embodiments. An arrangement at an arbitrary location along the communication path between the respective container 10-1 to 10-5 and the central computer 300 would also be conceivable in all embodiments. In this way, the processing device may also be implemented, for example, in the form of an application on a virtual server in a data network such as the Internet, wherein this is also possible for the entire WWS.

The communication interfaces and communication types used do not have to be described in detail because they can be chosen by a person skilled in the art within the scope of the solutions presented herein. In this context, "wireless" LAN (WLAN), Bluetooth, Zig-Bee and the like are merely mentioned as examples for the radio link of the detection device.

The method proposed herein solves the problem of known methods for detecting the fill level of a container for transporting and/or storing objects, particularly piece goods or bulk materials, with a container bottom and an inner container wall, namely that the relative error of the determined number of objects usually increases as the number of objects in the container decreases. For this purpose, it is proposed to estimate the number of objects in the container with the aid of a value of the container volume occupied by the objects or the already emptied container volume, in particular, on the basis of an average object volume of one or a certain number of the objects as long as the container bottom is covered by objects situated in such a container, and to individually count the objects in the container, in particular, by identifying the individual objects on the container bottom as soon as a certain portion of the container bottom is visible. Consequently, the method can deliver a result, the accuracy of which with respect to determining the number of objects situated in the container increases as the number of objects decreases.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method using an optical detection of the fill level of a container for transporting and/or storing countable objects, the container having a container bottom and an inner container wall the method comprising:

estimating, from an image provided by the optical detection, a number of countable objects in the container with the aid of a value of the container volume occupied by the countable objects or the already emptied container volume on the basis of an average object volume of one or of a predetermined number of countable objects as long as the container bottom is covered by countable objects situated in the container; and counting, from the image provided by the optical detection, the countable objects in the container by identifying the individual countable objects on the container bottom as soon as a predetermined portion of the container bottom is visible, wherein estimating, from an image provided by the optical detection, a number of countable objects in the container comprises:

detecting a 2-dimensional projection of 3-dimensional, spatially resolved reference intensity information $F(Z_{IO}, t_0)$ on an inner surface of the container when the container is empty;

detecting a 2-dimensional projection of 3-dimensional, spatially resolved actual state intensity information $F(Z_x, T_x)$ on the interior of the container that is filled up to a current fill level; and determining the current fill level based on an interrelation of at least part of the acquired actual state intensity information $F(Z_x, T_x)$ to adjacent reference intensity information $F(Z_{IO}, t_0)$ as long as the container bottom is covered by countable objects situated in the container.

2. The method according to claim 1, wherein the reference intensity information $F(Z_{IO}, t_0)$ is acquired in the form of a digital reference image of the interior of the container and the actual state intensity information $F(Z_x, T_x)$ is acquired in the form of a digital actual state image of the interior of the container that is filled up to the current fill level by means of an optical detection device and wherein the reference image and/or the actual state image is/are stored for further processing.

3. The method according to claim 1, wherein the 2-dimensional reference intensity information $F(Z_{IO}, t_0)$ is newly initialized or acquired in a respectively empty state prior to each filling of the container.

4. The method according to claim 1, wherein the fill level is determined by calculating inverse intensity information $F(Z_{IO-x}, T_x)$ for visible areas of the inner container wall by applying a convolution operation or correlation operation between the acquired reference intensity information of the empty container $F(Z_{IO}, t_0)$ and the acquired state intensity information of the filled container $F(Z_x, T_x)$.

5. The method according to claim 1, comprising generating a reference model for the empty container by:

separating reference intensity information $F(Z_{IO}, t_0)$ of a predefined reference pattern subgroup from the acquired actual state intensity information $F(Z_x, T_x)$; and transforming the separated reference pattern subgroup by means of a transformation G that is predefined such that a 3-dimensional reference model of the empty container is obtained, wherein the 3-dimensional reference model can be calibrated, particularly with respect to its length, width, and height, by means of the actual dimensions of the container.

6. The method according to claim 5, wherein the reference pattern subgroup in the form of an inner edge reference pattern of state intensity information $F(Z_{IOKante}, T_x)$ contains all points $R_{IOKante}$ that lie on inner edges of the container and respectively have corresponding state vectors $Z_{IOKante}$ ($R_{IOKante}$, I, T) and/or wherein the reference pattern subgroup in the form of a marking reference pattern of state intensity information $F(Z_{IOMuster}, T_x)$ consists of points $R_{IOMuster}$ that lie on specially marked surface areas of the bottom and/or the inner container wall and respectively have corresponding state vectors $Z_{IOMuster}$($R_{IOMuster}$, I, T).

7. The method according to claim 5, further comprising projecting the inverse intensity information $F(Z_{IO-x}, T_x)$ into the 3-dimensional space of the reference model, particularly by means of the predefined transformation G, such that the result $G(F(Z_{IO-x}))$ represents an empty net volume of the filled container true-to-scale in the 3-dimensional space of the reference model.

8. The method according to claim 7, further comprising determining fill level information on the container in the form of a quantitative fill level dimension at the time Tx by subtracting the empty net volume $G(F(Z_{IO-x}))$ from the volume of the reference model of the empty container $G(F(Z_{IOKanten}))$.

9. The method according to claim 8, further comprising determining fill level information on the container in the form of an estimated value for the number of countable objects in the container at the time $T_x$ by dividing the quantitative dimension for the fill level of the container by the average object volume of one individual countable object or a predetermined number of countable objects.

10. The method according to claim 8, further comprising storing the state intensity information $F(Z_x, T_x)$ and/or the fill level information together with the corresponding information on the fill level and a timestamp for the detection time $T_x$ after determining the fill level of the container.

11. The method according to claim 1, further comprising illuminating the interior of the container immediately prior to each detection step with a light source that emits light of a predetermined wavelength or a predetermined wavelength range and for a predetermined illumination time, in the form of a brief light or radiation flash.

12. A method using an optical detection of the fill level of a container for transporting and/or storing countable objects, the container having a container bottom and an inner container wall the method comprising:

estimating, from an image provided by the optical detection, a number of countable objects in the container with the aid of a value of the container volume occupied by the countable objects or the already emptied container volume on the basis of an average object volume of one or of a predetermined number of countable objects as long as the container bottom is covered by countable objects situated in the container; and counting, from the image provided by the optical detection, the countable objects in the container by identifying the individual countable objects on the container bottom as soon as a predetermined portion of the container bottom is visible, wherein counting, from the image provided by the optical detection, the countable objects in the container further comprises:

determining that a certain portion of the container bottom is visible if a certain number of state vectors $Z_{IOBoden}$ ($R_{IOBoden}$, I, $T_x$) that can be assigned to the container bottom have predefined intensity values after detecting a 2-dimensional projection of a 3-dimensional, spatially resolved actual state intensity information $F(Z_x, T_x)$ on the container with unknown fill level; and determining the number of countable objects in the container by evaluating only state vectors $Z_{IOBoden}$ ($R_{IOBoden}$, I, $T_x$) of the container bottom by means of object recognition and counting the recognized countable objects.

13. A container for transporting and/or storing countable objects comprising:
   a container bottom;
   a container side wall;
   a detection device that is integrated into an inner container wall or arranged thereon and includes at least one camera with an optical system and an integrated optical sensor configured to optically acquire intensity information in the container interior; and
   a communication interface that is functionally coupled to the detection device in order to transmit the acquired intensity information to a processing device,
   wherein the container bottom and/or the inner container wall at least partially reflects light or emits radiation due to activatable 3-dimensional emission processes,
   wherein the processor estimates, from the intensity information acquired by the detection device and transmitted by the communication interface, a number of countable objects in the container with the aid of a value of the container volume occupied by the countable objects or the already emptied container volume on the basis of an average object volume of one or of a predetermined number of countable objects as long as the container bottom is covered by countable objects situated in the container, and
   wherein the processor counts, from the intensity information acquired by the detection device and transmitted by the communication interface, the countable objects in the container by identifying the individual countable objects on the container bottom as soon as a predetermined portion of the container bottom is visible, and
   wherein estimating a number of countable objects in the container by the processor comprises:
   detecting a 2-dimensional projection of 3-dimensional, spatially resolved reference intensity information $F(Z_{IO}, t_0)$ on an inner surface of the container when the container is empty;
   detecting a 2-dimensional projection of 3-dimensional, spatially resolved actual state intensity information $F(Z_x, T_x)$ on the interior of the container that is filled up to a current fill level; and
   determining the current fill level based on an interrelation of at least part of the acquired actual state intensity information $F(Z_x, T_x)$ to adjacent reference intensity information $F(Z_{IO}, t_0)$ as long as the container bottom is covered by countable objects situated in the container.

14. A system for dynamically monitoring the fill levels of several containers, comprising:
   a plurality of containers for transporting and/or storing countable objects, each of said containers comprising a container bottom, a container side wall, a detection device that is integrated into an inner container wall or arranged thereon and includes at least one camera with an optical system and an integrated optical sensor configured to optically acquire intensity information in the container interior and a communication interface that is functionally coupled to the detection device in order to transmit the acquired intensity information to a processing device wherein the container bottom and/or the inner container wall at least partially reflects light or emits radiation due to activatable 3-dimensional emission processes,
   wherein the processing device is designed for respectively determining the current fill level of the plurality of containers by means of a method that includes:
   estimating, from an image provided by the optical detection, a number of countable objects in the container with the aid of a value of the container volume occupied by the countable objects or the already emptied container volume on the basis of an average object volume of one or of a predetermined number of countable objects as long as the container bottom is covered by countable objects situated in the container; and
   counting, from the image provided by the optical detection, the countable objects in the container by identifying the individual countable objects on the container bottom as soon as a predetermined portion of the container bottom is visible, and
   wherein estimating, from an image provided by the optical detection, a number of countable objects in the container comprises:
   detecting a 2-dimensional projection of 3-dimensional, spatially resolved reference intensity information $F(Z_{IO}, t_0)$ on an inner surface of the container when the container is empty;
   detecting a 2-dimensional projection of 3-dimensional, spatially resolved actual state intensity information $F(Z_x, T_x)$ on the interior of the container that is filled up to a current fill level; and
   determining the current fill level based on an interrelation of at least part of the acquired actual state intensity information $F(Z_x, T_x)$ to adjacent reference intensity information $F(Z_{IO}, t_0)$ as long as the container bottom is covered by countable objects situated in the container.

15. The system according to claim 14, wherein the processing device is integrated into the respective container and coupled to a communication device in order to transmit fill level information.

16. The system according to claim 14, wherein the processing device is situated in a unit that is arranged separately of the container and the communication interface features a wireless communication link for the communication between the detection device and the processing device.

* * * * *